United States Patent
Shimizu et al.

(10) Patent No.: US 6,845,310 B2
(45) Date of Patent: Jan. 18, 2005

(54) POWER STEERING SYSTEM

(75) Inventors: Noboru Shimizu, Tokyo (JP);
Tsunefumi Arita, Gifu (JP); Naoto Shima, Aichi (JP); Masashi Takai, Gifu (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/351,134

(22) Filed: Jan. 24, 2003

(65) Prior Publication Data
US 2003/0144782 A1 Jul. 31, 2003

(30) Foreign Application Priority Data

Jan. 25, 2002 (JP) .......................................... 2002-016504
Aug. 30, 2002 (JP) .......................................... 2002-254427

(51) Int. Cl.[7] .............................................. G06F 7/00
(52) U.S. Cl. ............................ 701/41; 701/44; 180/6.2; 180/6.28; 180/6.5; 180/422; 180/423; 180/421
(58) Field of Search ...................... 701/41, 44; 180/6.2, 180/6.28, 6.5, 422, 423, 421

(56) References Cited

U.S. PATENT DOCUMENTS

| | | | | | |
|---|---|---|---|---|---|
| 6,484,841 | B2 | * | 11/2002 | Takai et al. | 180/422 |
| 6,499,557 | B2 | * | 12/2002 | Takai et al. | 180/422 |
| 6,675,928 | B2 | * | 1/2004 | Takai et al. | 180/422 |
| 6,681,884 | B2 | * | 1/2004 | Shimizu et al. | 180/422 |
| 2003/0141193 | A1 | * | 7/2003 | Hossick-Schott | 205/104 |
| 2003/0144781 | A1 | * | 7/2003 | Shimizu et al. | 701/41 |
| 2003/0144782 | A1 | * | 7/2003 | Shimizu et al. | 701/41 |

* cited by examiner

*Primary Examiner*—Olga Hernandez
(74) *Attorney, Agent, or Firm*—Steinberg & Raskin, P.C.

(57) ABSTRACT

A power steering system capable of preventing an unnecessary standby flow produced in high speed travel. A controller C determines a basic current instruction value Id based on a current instruction value I1 in accordance with a steering angle detected by a steering angle sensor 14, a current instruction value I2 in accordance with a steering angular velocity and current instruction values I5, I6 in accordance with a vehicle speed, and adds a standby current instruction value Is to the basic current instruction value Id, and outputs the resultant value of the addition as a solenoid current instruction value SI, and changes the standby current instruction value Is on the basis of the vehicle speed.

2 Claims, 8 Drawing Sheets

POWER STEERING SYSTEM

BACKGROUND OF THE INVENTION

1. Field of the Invention

This invention relates to a power steering system including a flow control valve for the prevention of energy loss.

2. Description of Related Art

An example of power steering systems including a flow control valve for the prevention of energy loss is disclosed in Laid-open Japanese Patent Application No. 2001-260917 filed by the present applicant.

The flow control valve V of the power steering system of the prior art example includes, as illustrated in FIG. 7, a spool 1 having one end adjoining a pilot chamber 2 and the other end adjoining another pilot chamber 3.

The pilot chamber 2 continuously communicates with a pump P via a pump port 4. The pilot chamber 2 communicates via a flow pass 6, a variable orifice a and a flow path 7 with an inflow port of a steering valve 9 provided for controlling a power cylinder 8.

The pilot chamber 3 incorporates a spring 5 and also communicates with the inflow port of the steering valve 9 via a flow path 10 and the flow path 7. Accordingly, the variable orifice a, the flow path 7 and the flow path 10 provide the communication between the pilot chambers 2 and 3. Pressure upstream from the variable orifice a acts on the pilot chamber 2 and pressure downstream therefrom acts on the pilot chamber 3. The degree of opening of the variable orifice a is controlled by a solenoid current instruction value SI calculated for a solenoid SOL.

The spool 1 maintains a position at which the force acting on the pilot chamber 2, the force acting on the pilot chamber 3 and the force of the spring 5 are in balance. This balanced position determines the degree of opening of both the pump port 4 and a tank port 11.

For example, upon actuation of a pump driving source 12 such as an engine or the like, the pump P is driven to supply pressure oil into the pump port 4 to cause a flow in the variable orifice a. This flow produces a pressure difference between the two sides of the variable orifice a, and the pressure difference causes a difference in pressure between the pilot chambers 2 and 3. The resultant differential pressure resists the force of the spring 5 and moves the spool 1 from the normal position, illustrated in FIG. 7, to the balanced position.

Thus, moving the spool 1 from the normal position toward the balanced position increases the degree of opening of the tank port 11. In accordance with the resulting degree of opening of the tank port 11, the distribution ratio between a control flow QP introduced toward the steering valve 9 from the pump P and a return flow QT circulating back to the tank T or the pump P is determined. In other words, the control flow QP is determined in accordance with the degree of opening of the tank port 11.

The control of the control flow QP in accordance with the degree of opening of the tank port 11 as described above results in determination of the control flow QP in accordance with the degree of opening of the variable orifice a. This is because the position to which the spool 1 is shifted, which determines the degree of opening of the tank port 11, is determined by the differential pressure between the two pilot chambers 2 and 3, and this differential pressure is determined by the degree of opening of the variable orifice a.

Thus, in order to control the control flow QP in accordance with the vehicle speed or the steering condition of the vehicle, the degree of opening of the variable orifice a, or the solenoid current instruction value SI for the solenoid SOL may be controlled. This is because the degree of opening of the variable orifice a is controlled in proportion to an exciting current of the solenoid SOL so that the variable orifice a holds the degree of its opening to a minimum in the non-excited state of the solenoid SOL and increases the degree of its opening as the exciting current is increased.

The steering valve 9 applied with the control flow QP controls the amount of oil supplied to the power cylinder 8 in accordance with the input torque (steering torque) of the steering wheel (not shown). For example, if the steering torque is large, the amount of shifting of the steering valve 9 is increased to increase the amount of oil supplied to the power cylinder 8, whereas if it is small, the amount of shifting of the steering valve 9 is decreased to decrease the amount of oil supplied to the power cylinder 8. The larger the amount of supply of pressure oil, the higher the assist force that the power cylinder 8 exerts. The smaller the amount of supply, the lower the assist force that the power cylinder 8 exerts.

The steering torque and the amount of shifting of the steering valve 9 are determined by a torsion reaction of a torsion bar (not shown) or the like.

As described above, the steering valve 9 controls a flow QM supplied to the power cylinder 8, and the flow control valve V controls the control flow QP supplied to the steering valve 9. If the flow QM required by the power cylinder 8 comes as close as possible to the control flow QP determined by the flow control valve V, it is possible to reduce the energy loss around the pump P. This is because the energy loss around the pump P is caused by the difference between the control flow QP and the flow QM required by the power cylinder 8.

In order to make the control flow QP as close as possible to the flow QM required by the power cylinder 8 for the prevention of energy loss, the system of the prior art example controls the degree of opening of the variable orifice a. The degree of opening of the variable orifice a is determined by the solenoid current instruction value SI for the solenoid SOL as described earlier. The solenoid current control value SI is controlled by a controller C which will be described in detail next.

The controller C is connected to a steering angle sensor 14 and a vehicle speed sensor 15. As illustrated in FIG. 8, the controller C determines a current instruction value I1 based on the steering angle detected by the steering angle sensor 14, and also a current instruction value I2 based on the steering angular velocity calculated by differentiating the steering angle.

The relationship between the steering angle and the current instruction value I1 is determined on the basis of theoretical values giving linear characteristics to the relationship between the steering angle and the control flow QP. The relationship between the steering angular velocity and the current instruction value I2 is also determined on the basis of theoretical values giving linear characteristics to the relationship between the steering angular velocity and the control flow QP. Both the current instruction values I1 and I2 outputted are zero unless the steering angle and the steering angular velocity exceed a set value. Specifically, when the steering wheel is positioned at or around the center, the current instruction values I1, I2 are outputted at zero in order to set a dead zone around the center.

Further, the controller C outputs a steering angle-related current instruction value I3 and a steering angular velocity-related current instruction value I4 which are based on the value detected by the vehicle speed sensor.

The steering angle-related current instruction value I3 is outputted at one at low vehicle speeds and, for example, at 0.6 at maximum vehicle speeds. The steering angular velocity-related current instruction value I4 is also outputted at 1 at low vehicle speeds and, for example, at 0.8 at maximum vehicle speeds. Specifically, regarding gain in a range from low vehicle speeds to maximum vehicle speeds, the steering angle-related current instruction value I3 controlled in a range of 1 to 0.6 is set to be larger than the steering angular velocity-dedicated current instruction value I4 controlled in a range of 1 to 0.8.

Then, the steering angle-related current instruction value I3 is multiplied by the steering angle-based current instruction value I1. Therefore, a steering angle-based current instruction value I5 resulting from the multiplication is smaller as the vehicle speed increases. In addition, the steering angle-related current instruction value I3 has gain set larger than that of the steering angular velocity-related current instruction value I4, so that the higher the vehicle speed becomes, the higher the rate of decrease of the current instruction value I5 becomes. That is to say, response is kept high at low vehicle speeds and is reduced at high vehicle speeds. Thus, the response is changeable depending on a vehicle speed. This is because a high response is not usually required during high-speed travel but is necessary at low vehicle speeds in most cases.

The controller C applies the steering angular velocity-related current instruction value I4 serving as a limit value to the current instruction value I2 based on the steering angular velocity to output a steering angular velocity-based current instruction value I6. The current instruction value I6 is also decreased in accordance with the vehicle speed. Note that the gain of the steering angular velocity-related current instruction value I4 is smaller than that of the steering angle-dedicated current instruction value I3 so that the rate of decrease of the current instruction value I6 is smaller than that of the current instruction value I5.

The limiting value, as described above, is set in accordance to a vehicle speed in order to mainly prevent an excessive assist force from being exerted during high-speed travel.

The controller C makes a comparison between the steering angle-based current instruction value I5 and the steering angular velocity-based current instruction value I6 outputted as described above, and adopts the larger value of the two.

For example, the steering wheel is rarely rotated abruptly during high-speed travel, and therefore the steering angle-based current instruction value I5 is typically larger than the steering angular velocity-based current instruction value I6. Accordingly, in most cases, the steering angle-based current instruction value I5 is selected during high speed travel. A large gain of the current instruction value I5 is set in order to enhance the safety and stability in operation of the steering wheel at that point. In other words, as the traveling speed increases, the ratio of decreasing the control flow QP is increased for enhancement the safety and stability on traveling.

On the other hand, the steering wheel is often rotated abruptly during low-speed travel so that the steering angular velocity-based current instruction value I6 is larger in many cases than the steering angle-based current instruction value I5. Therefore, the steering angular velocity-based current instruction value I6 is almost selected during low speed travel. When the steering angular velocity is high, the response is regarded as being of importance.

Thus, in low-speed travel, the steering angular velocity is used as the referred, and a small gain of the steering angular velocity-based current instruction value I6 is set in order to enhance the operability of the steering wheel, or the response. In other words, if the traveling speed is somewhat increased, the control flow QP ensured to a sufficient degree makes it possible to ensure the response when the steering wheel is abruptly rotated.

The controller C adds a standby current instruction value I7 to the current instruction value I5 or I6 selected as described above, and outputs the resultant value of this addition to a driving unit 16 as a solenoid current instruction value SI.

Because of the addition of the standby current instruction value I7, the solenoid current instruction value SI is kept at a predetermined magnitude even when all of the current instruction values based on the steering angle, the steering angular velocity and the vehicle speed are zero. For this reason a predetermined flow is routinely supplied to the steering valve 9. However, in terms of the prevention of energy loss, the control flow QP in the flow control valve V ideally becomes zero when the flow QM required by the power cylinder 8 and the steering valve 9 is zero. Specifically, if the control flow QP is zero, the total amount of oil discharged from the pump P is circulated back from the tank port 11 to the pump P or the tank T. The path of the oil flow returning from the tank port 11 to the pump P or the tank T is extremely short within the body B, so that little pressure loss occurs. Due to the significantly low degree of pressure loss, the driving torque of the pump P is controlled to a minimum, leading to energy conservation as much as the driving torque is controlled. In this context, the fact that the control flow QP is reduced to zero when the required flow QM is zero has an advantage in terms of preventing energy loss.

Nevertheless, a standby flow QS is maintained even when the required flow QM is zero. This is because of the following.

(1) To prevent seizure in the system. The circulation of a standby flow QS through the system can provide cooling effects.

(2) To ensure response. The maintenance of the standby flow QS, as described above, saves more time for attaining the target control flow QP than that in the case of absence of maintenance of the standby flow QS. The resulting time difference affects the response. As a result, the maintenance of the standby flow QS leads to improvement of the response.

(3) To counter disturbances, such as kickback and the like, and self-aligning torque. The reaction to disturbances or self-aligning torque acts on the wheels, which then acts on the rod of the power cylinder 8. If the standby flow is not maintained, the reaction to the self-aligning torque or the disturbances makes the wheels unsteady. However, the maintenance of the standby flow prevents the wheels from becoming unsteady even when the reaction acts on the wheels. Specifically, the rod of the power cylinder 8 engages with a pinion for switching the steering valve 9, and the like. Hence, upon the onset of the reaction, the steering valve is also switched to supply the standby flow in a direction counter to the reaction. Therefore, maintaining of the standby flow makes it possible to counter the self-aligning torque and the disturbance caused by the kickback.

Next, a description will be given of the operation of the power steering system of the prior art example.

When the vehicle is travelling, the controller C outputs a steering angle-based current instruction value I5 acquired by multiplying a solenoid current instruction value I1 based on the steering angle by the steering angle-related current instruction value I3, and also outputs a steering angular velocity-based current instruction value I6. The current instruction value I6 is set by applying the steering angular velocity-based current instruction value I4 serving as a limit value to a solenoid current instruction value I2 based on the steering angular velocity.

Then, the controller C determines which is the larger value of the steering angle-based current instruction value I5 and the steering angular velocity-based current instruction value I6, then adds the standby current instruction value I7 to the larger value, the current instruction value I5 or I6, to acquire the solenoid current instruction value SI at this point. The solenoid current instruction value SI is mainly determined with reference to the steering angle-based current instruction value I5 when driving a vehicle at high speed and based on the steering angular velocity-based current instruction value I6 when driving a vehicle at low speed.

The spool 1 has a slit 13 formed at its leading end. Even when the spool 1 is in the normal position illustrated in FIG. 7, the slit 13 establishes communication between the pilot chamber 2 and the variable orifice a. Specifically, even when the spool 1 is in the normal position, the pressure oil supplied from the pump port 4 to the pilot chamber 2 is further supplied through the slit 13, flow path 6, variable orifice a and then flow path 7 to the steering valve 9. Due to such supply of the pressure oil, the system successfully achieves the prevention of seizure and disturbances such as kickback or the like, and the ensured response.

FIG. 7 illustrates the driving unit 16 provided for driving the solenoid SOL and connected to the controller C and the solenoid SOL, throttles 17 and 18, and a relief valve 19.

In the prior art power steering system as described above, a standby current instruction value Is is added for preventing the system from being seized, ensuring response, and countering disturbances, such as kickback and the like, and a self-aligning torque.

However, the above response is required mainly at low vehicle speeds and not so much required at high vehicle speeds. This is because a high response when travelling at high speeds causes unstable steering. In the prior art system, the standby current instruction value is fixed so that the standby flow is set with respect to low vehicle speeds in which a high response is needed.

Setting the standby flow with respect to the low vehicle speeds leads to a problem of energy loss produced by supplying the standby flow more than necessary in high-speed travel.

SUMMARY OF THE INVENTION

It is an object of the present invention to provide a power steering system which is capable of preventing an unnecessary standby flow during high-speed travel.

A first feature of the present invention provides a power steering system including: a steering valve for controlling a power cylinder; a variable orifice provided upstream from the steering valve; a solenoid for controlling a degree of opening of the variable orifice; a controller for controlling a solenoid current instruction value SI used for driving the solenoid; a steering angle sensor and a vehicle speed sensor which are connected to the controller; and a flow control valve dividing a flow, supplied from a pump, into a control flow supplied to the steering valve in accordance with the degree of opening of the variable orifice and a return flow circulating back to a tank or the pump, and in the first feature the controller determines a basic current instruction value on the basis of a current instruction value in accordance with a steering angle supplied from the steering angle sensor, a current instruction value in accordance with a steering angular velocity, and current instruction values in accordance with a vehicle speed, and adds a standby current instruction value to the basic current instruction value, and outputs the resultant value of the addition as the solenoid current instruction value, and changes the standby current instruction value on the basis of the vehicle speed.

A second feature of the present invention provides a power steering system including: a steering valve for controlling a power cylinder; a variable orifice provided upstream from the steering valve; a solenoid for controlling a degree of opening of the variable orifice; a controller for controlling a solenoid current instruction value SI used for driving the solenoid; a steering torque sensor and a vehicle speed sensor which are connected to the controller; and a flow control valve dividing a flow, supplied from a pump, into a control flow supplied to the steering valve in accordance with the degree of opening of the variable orifice and a return flow circulating back to a tank or the pump, and in the second feature the controller determines a basic current instruction value on the basis of a current instruction value in accordance with steering torque detected by the steering torque sensor and a current instruction value in accordance with a vehicle speed detected by the vehicle speed sensor, and adds a standby current instruction value to the basic current instruction value, and outputs the resultant value of the addition as the solenoid current instruction value, and changes the standby current instruction value on the basis of the vehicle speed.

A third feature of the present invention provides a power steering system including: a steering valve for controlling a power cylinder; a variable orifice provided upstream from the steering valve; a solenoid for controlling a degree of opening of the variable orifice; a controller for controlling a solenoid current instruction value SI used for driving the solenoid; a steering angle sensor, a vehicle speed sensor and an engine speed sensor which are connected to the controller; and a flow control valve dividing a flow, supplied from a pump, into a control flow supplied to the steering valve in accordance with the degree of opening of the variable orifice and a return flow circulating back to a tank or the pump, and in the third feature the controller determines a basic current instruction value on the basis of a current instruction value in accordance with a steering angle supplied from the steering angle sensor, a current instruction value in accordance with a steering angular velocity and current instruction values in accordance with a vehicle speed, and adds a standby current instruction value to the basic current instruction value, and outputs the resultant value of the addition as the solenoid current instruction value, and changes the standby current instruction value on the basis of the number of revolutions of an engine or strokes of a pump detected by the engine speed sensor.

A fourth feature of the present invention provides a power steering system including: a steering valve for controlling a power cylinder; a variable orifice provided upstream from the steering valve; a solenoid for controlling a degree of opening of the variable orifice; a controller for controlling a solenoid current instruction value SI used for driving the solenoid; a steering torque sensor, a vehicle speed sensor and an engine speed sensor which are connected to the controller; and a flow control valve dividing a flow, supplied from a pump, into a control flow supplied to the steering valve in accordance with the degree of opening of the variable orifice and a return flow circulating back to a tank or the pump, and in the fourth feature the controller determines a basic current instruction value on the basis of a current instruction value in accordance with steering torque detected by the steering torque sensor and a current instruction value in accordance with a vehicle speed detected by the vehicle speed sensor, and adds a standby current instruction value to the basic current instruction value, and outputs the resultant value of the addition as the solenoid current instruction value, and changes the standby current instruction value on the basis of the number of revolutions of an engine or strokes of a pump detected by the engine speed sensor.

According to the first and second features, the standby current instruction value Is is changed on the basis of the vehicle speed. Consequently, a decrease in the solenoid current instruction value Is at medium and high vehicle speeds makes it possible to prevent an unnecessary standby flow at high vehicle speeds.

According to the third and fourth features, the standby current instruction value is changed on the basis of the number of revolutions of the engine or strokes of a pump. Consequently, a decrease in the solenoid current instruction value Is at high engine speeds of the engine or pump makes possible to prevent a needless standby flow at high vehicle speeds.

DETAILED DESCRIPTION OF THE PREFERRED EMBODIMENTS

Figure 1:
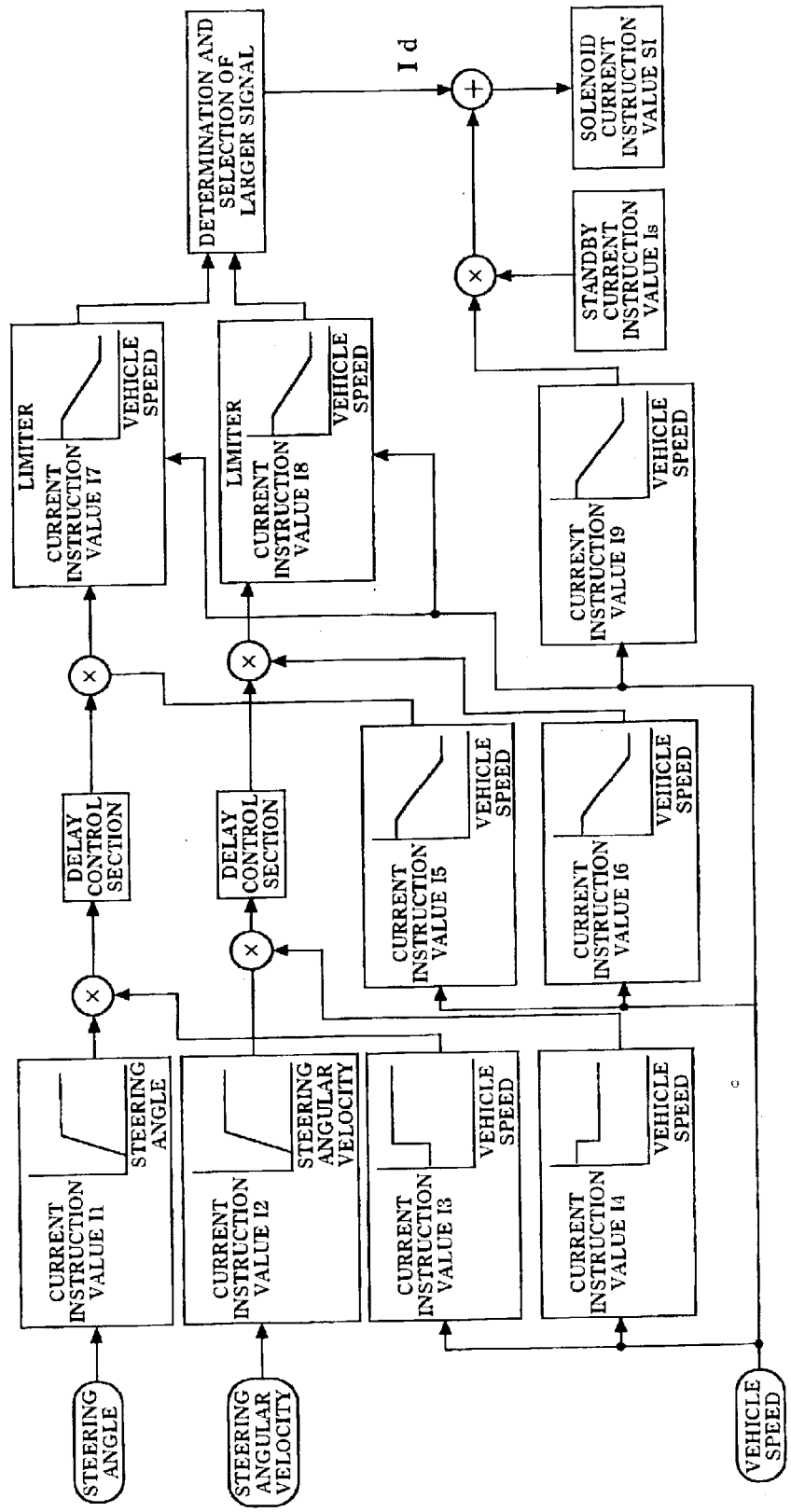
FIG. 1 is a diagram illustrating a control system of a controller C in a first embodiment.
Figure 7:
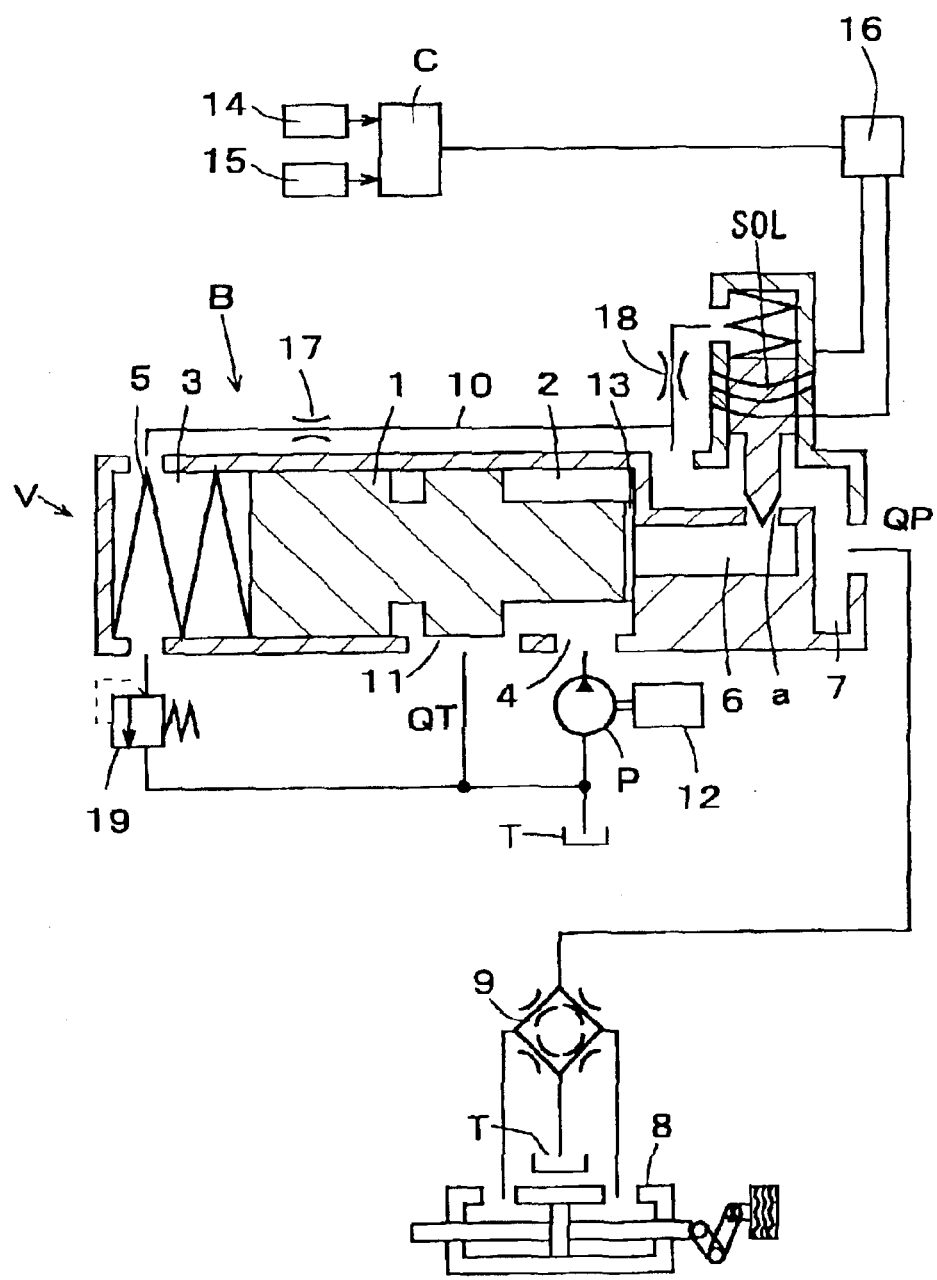
FIG. 7 is a general view illustrating a power steering system in the prior art.
Figure 8:
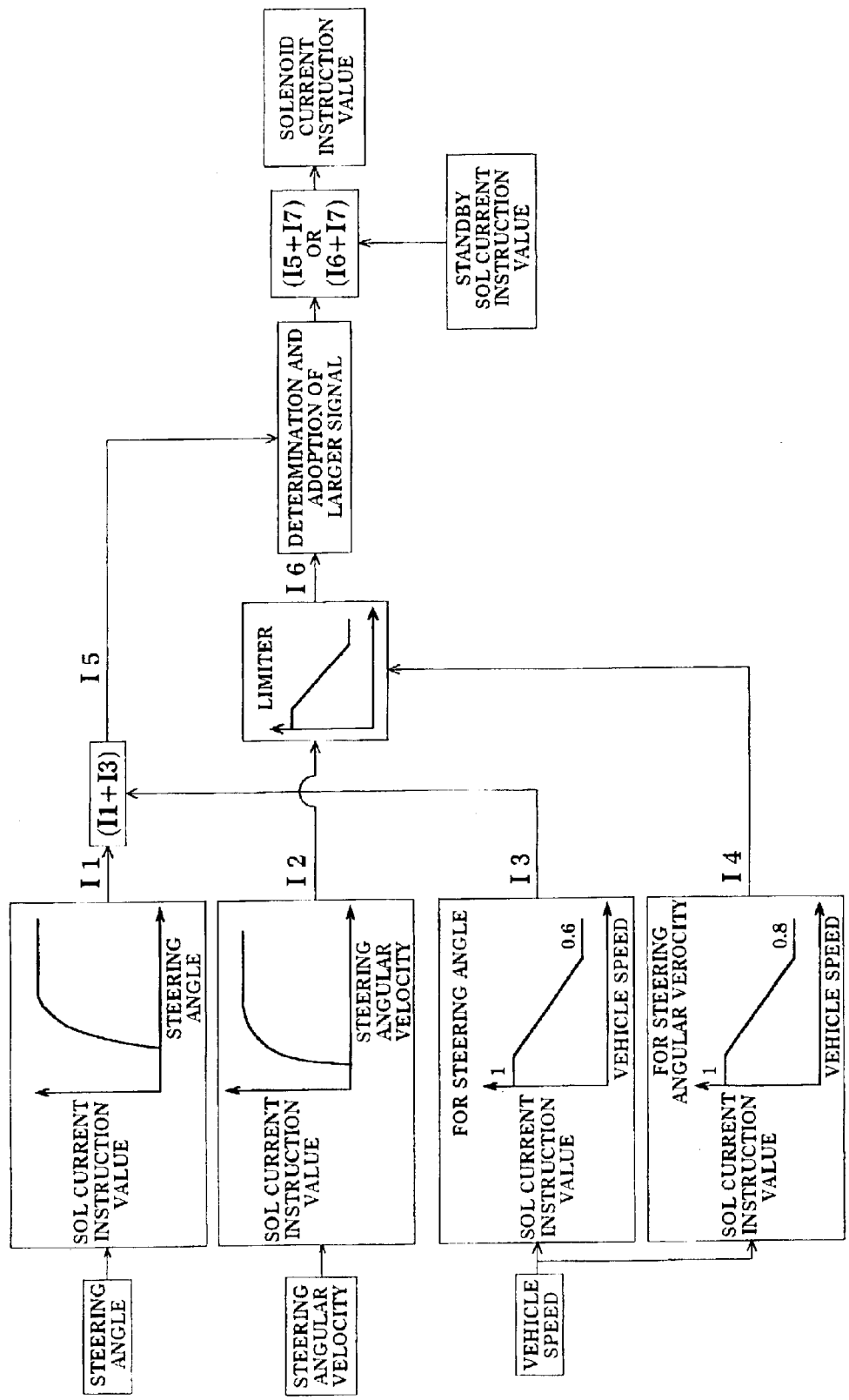
FIG. 8 is a diagram illustrating a control system of a controller C of the prior art.

FIG. 1 illustrates a control system of a controller C of a first embodiment. In the case of the first embodiment, the power steering system has the same configuration including the flow control valve V, the power cylinder 8, the steering valve 9, and the like illustrated in FIG. 7, exclusive of the controller C, as that of the prior art example, and the following description will be given of the control system of the controller C.

As illustrated in FIG. 1, the controller C determines a current instruction value I1 based on the steering angle detected by the steering angle sensor 14 and a current instruction value I2 based on the steering angular velocity calculated by differentiating the steering angle. Note that a steering angular velocity sensor may be additionally provided to determine the current instruction value I2 based on the steering angular velocity detected by this steering angular velocity sensor.

The relationship between the steering angle and the current instruction value I1 is determined on the basis of theoretical values giving linear characteristics to the relationship between the steering angle and a control flow QP. The relationship between the steering angular velocity and the current instruction value I2 is also determined on the basis of theoretical values giving linear characteristics to the relationship between the steering angular velocity and the control flow QP.

The controller C outputs a steering angle-related current instruction value I3 and a steering angular velocity-related current instruction value I4, on the basis of a value detected by the vehicle speed sensor 15. The current instruction value I3 decreases when the vehicle speed is at zero or at extremely slow speeds, and is outputted at 1 when the vehicle speed exceeds a fixed speed. The current instruction value I4 is outputted at larger than one value when the vehicle speed is at zero or at extremely slow speeds, and at 1 when the vehicle speed exceeds a fixed speed. The controller C multiplies the steering angle-based current instruction value I1 by the current instruction value I3, and also the steering angular velocity-based current instruction value I2 by the current instruction value I4.

As described above, the multiplication of the current instruction value I1 by the current instruction value I3 based on the vehicle speed is preformed for the purpose of preventing energy loss when the vehicle stops or when the vehicle is driven at extremely slow speeds with the steering wheel being turned. For example, when driving the vehicle into a car shed, it is sometimes parked with the engine running for a while in a state of turning the steering wheel. In this event the current instruction value I1 determined in accordance with the steering angle is outputted as a solenoid current instruction value SI so that an unnecessary flow is supplied to the steering valve 9 as much. In order to prevent energy loss in such a case, when the vehicle speed is at zero or at extremely slow speeds, the current instruction value I1 is multiplied by the current instruction value I3 to decrease the steering angle-based current instruction value I1.

However, decreasing the current instruction value I3 as described above leads to low response when the driver begins to turn the steering wheel held in the already-rotated position. Therefore, the controller C multiplies the steering angular velocity-based current instruction value I2 by the current instruction value I4 outputted at a large value when the vehicle speed is at zero or at extremely slow speeds, in order to ensure an adequate response.

Figure 2:
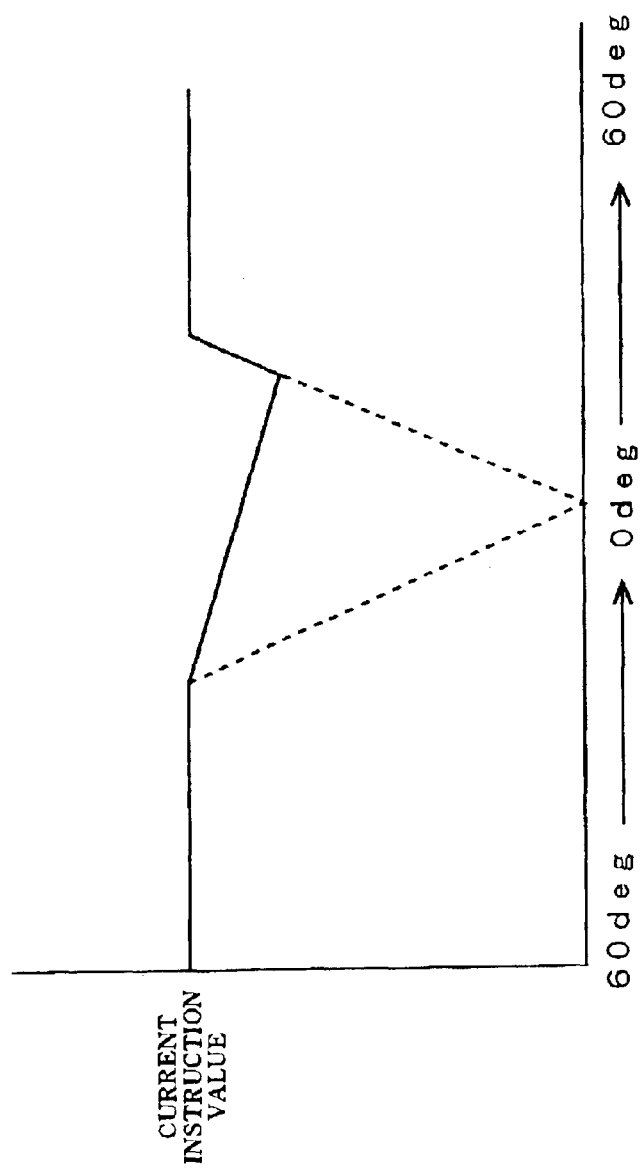
FIG. 2 is a graph showing characteristics of delay control.

After the multiplication of the current instruction values I3, I4 based on the vehicle speed by the current instruction values I1, I2, each of the resultant values (I1×I3) and (I2×I4) undergoes delay control. The delay control is performed for reducing the rate of decrease of an inputted current instruction value when the inputted current instruction value suddenly and sharply decreases. As illustrated in FIG. 2, for example, the steering wheel is rotated 60 degrees, then returned to the central position, and then rotated 60 degrees again. In this case, the steering angle-based and steering angular velocity-based current instruction value I1 and I2 temporarily decrease to zero and then increases again. In other words, the current instruction values I1, I2 each forms a letter V shape indicated by the broken line in FIG. 2. If the value I1 or I2 is directly outputted as the solenoid current instruction value SI, a sudden change in a flow supplied to the steering valve 9 inconveniently makes a driver uncomfortable with the steering.

Hence, in order to solve the above inconveniences, the delay control is performed on the values (I1×I3) and (I2×I4). Specifically, when an inputted value decreases on a sudden, the delay control makes the rate of decrease of the current instruction value small to gradually decrease the current instruction value as shown by the solid line of FIG. 2. This manner prevents a sudden and sharp change in the current instruction value around a zero-degree angled position of the steering wheel, resulting in avoidance of causing discomfort to the driver.

After the above delay control, the controller C multiplies the current instruction values by the corresponding current instruction values I5, I6 based on the vehicle speed. The current instruction values I5, I6 are each outputted at 1 at low vehicle speeds and at a value of a decimal point below 1 at maximum speeds. For this reason, the inputted value is directly outputted at low vehicle speeds. The higher the vehicle speed, the smaller the outputted value. In other words, a high response is maintained at low vehicle speeds and the response is reduced at high vehicle speeds. The reason why response is changed in accordance with the vehicle speed in this manner is that a high response is not much required at high vehicle speeds but is required at low vehicle speeds in most cases.

The controller applies current instruction values I7, I8, each set on the basis of the vehicle speed and serving as a limit value, to the corresponding current instruction values resulting from the multiplication. Specifically, if the resultant value of the multiplication exceeds the vehicle speed-based current instruction value I7 or I8 at this point, the excessive amount is eliminated and the current instruction values below their respective limiting values are each outputted. The limiting value based on the vehicle speed is determined for the purpose of preventing excessive assist force from being exerted during high-speed travel.

The current instruction values I7, I8 are also set to decrease in accordance with the vehicle speed and their gains are set smaller than those of the current instruction values I5, I6.

Next, The controller C makes a comparison between the steering angle-based current instruction value and the steering angular velocity-based current instruction value which are controlled within the limit value as described above, and adopts the larger value of the two. The larger current instruction value is determined as a basic current instruction value Id.

After obtaining the basic current instruction value Id in this manner, the controller C adds a standby current instruction value Is to the basic current instruction value Id. The standby current instruction value Is is not added directly. Before that, the standby current instruction value Is is multiplied by a current instruction value I9 set on the basis of the vehicle speed, and then the resultant value of the multiplication is added.

The vehicle speed-based current instruction value I9 is outputted at one at low vehicle speeds. Then, at medium vehicle speeds, the current instruction value I9 is gradually smaller with an increase of the vehicle speed. Then, at high vehicle speeds, the current instruction value I9 is maintained at the minimum level. Therefore, the value obtained by the multiplication of the vehicle speed-based current instruction value I9 by the standby current instruction value Is is outputted at low vehicle speeds without change, and is gradually decreased at vehicle speeds from medium toward high. Then, the current instruction value I9 is maintained at the minimum level at high vehicle speeds. Note that the value obtained by the multiplication of the current instruction value I9 by the standby current instruction value Is is not reduced to zero even at high vehicle speeds.

Figure 5:
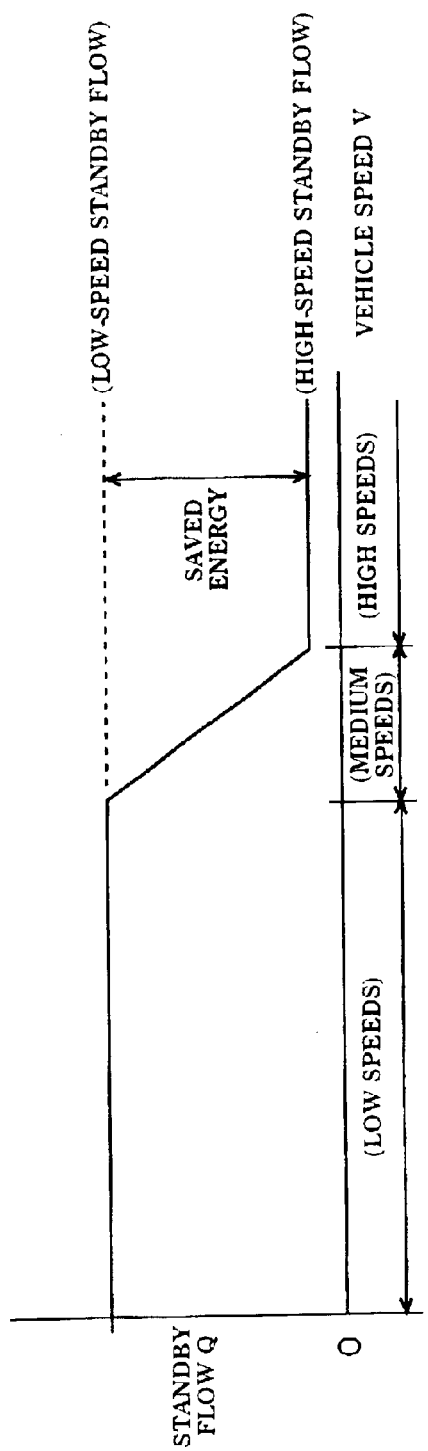
FIG. 5 is a graph showing the relationship between a standby flow Q and a vehicle speed V.

As described above, reducing the standby current instruction value in accordance with the vehicle speeds from medium toward high, allows a reduction in the standby flow at vehicle speeds from medium toward high as described in FIG. 5. Hence, the reduction of the standby flow prevents a useless consumption of energy. Note that the standby flow at low vehicle speeds is herein referred to as a low-speed standby flow and similarly the standby flow at high vehicle speeds is referred to as a high-speed standby flow indicates the standby flow.

After adding the standby current instruction value (Is×I9) to the basic current instruction value Id as described above, the controller outputs the resultant value of the addition to the driving unit 16 (see FIG. 7) as a solenoid current instruction value SI. Then, the driving unit 16 outputs an exciting current corresponding to the solenoid current instruction value SI to a solenoid SOL.

In the first embodiment, the controller C includes limiters individually provided for applying the current instruction values I7, I8 serving as the limiting values to the corresponding and resultant values immediately after the multiplication of the current instruction values I5, I6 serving as the gains. However, instead of the individual limiters, an across-the-board limiter may be provided for applying a vehicle speed-based current instruction value serving as a limiting value to the value resulting from the addition of the standby current instruction value.

Further, in the first embodiment, the vehicle speed-based current instruction values I5, I6 are separately multiplied as gains after the delay control is carried out. However, instead of the separate multiplication of the gains, the value selected in the value comparison may be multiplied by a vehicle speed-based current instruction value as an across-the-board gain.

Still further, an across-the-board limiter may be provided for applying a vehicle speed-based current instruction value serving as a limiting value to a value resulting from the addition of the standby current instruction value, and also the value adopted by the value comparison may be multiplied by a vehicle speed-based current instruction value as an across-the-board gain.

Figure 3:
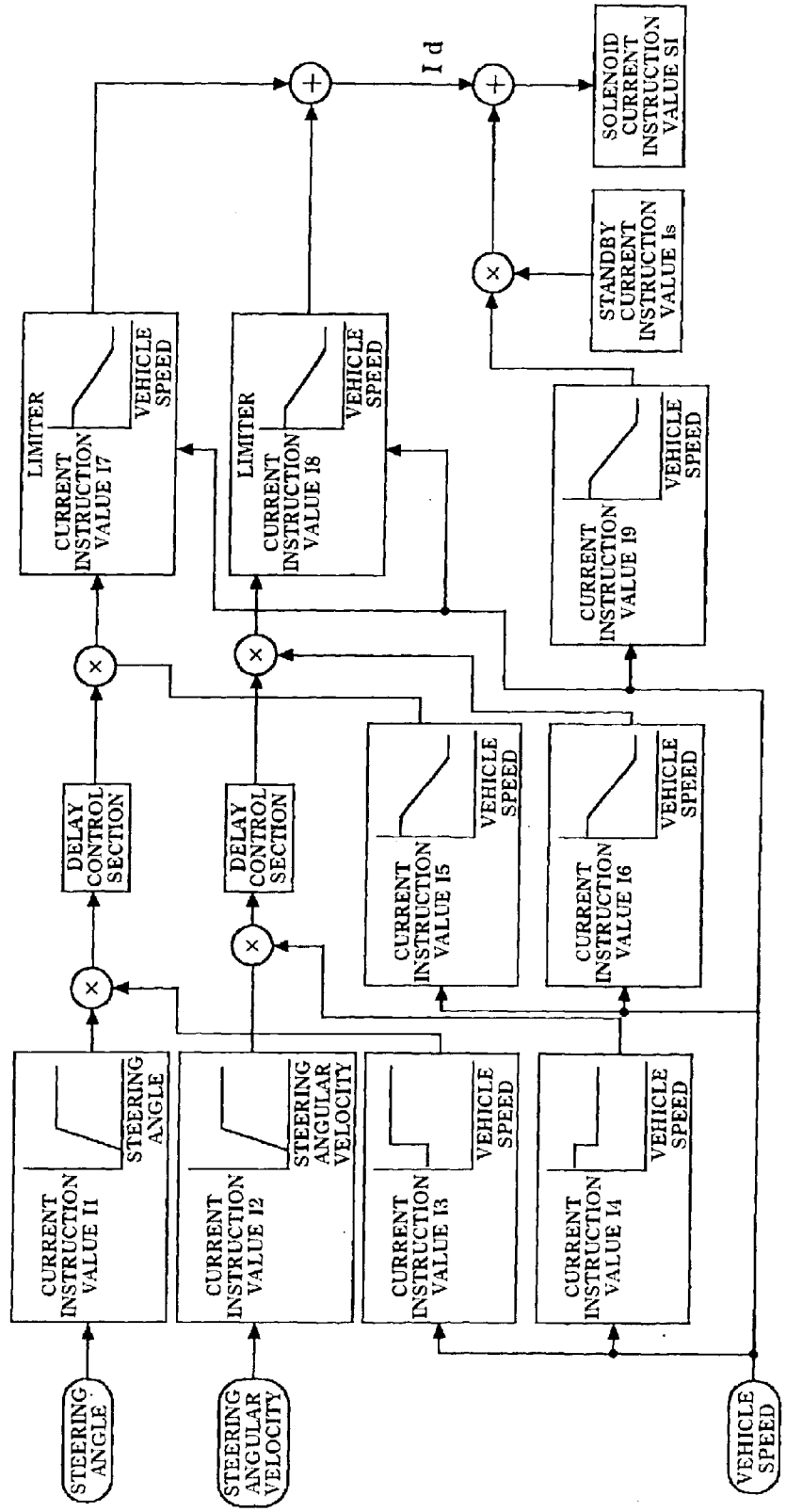
FIG. 3 is a diagram illustrating a control system of a controller C in a second embodiment.

Next, the second embodiment is illustrated in FIG. 3. The steering angle-based current instruction value and the steering angular velocity-based current instruction value are compared and the larger value of the two is adopted in the first embodiment. However, in the second embodiment, both of these current instruction values are added to each other. The other configuration in the second embodiment is identical with that in the first embodiment.

As described above, the controller may add the steering angle-based current instruction value to the steering angular velocity-based current instruction value to obtain a solenoid current instruction value SI in view of both characteristics of a steering angle and a steering angular velocity.

In the second embodiment as well as the first embodiment, the value obtained by the multiplication of a standby current instruction value Is by a current instruction value I9 based on the vehicle speed is added to a basic current instruction value Id so that a standby flow is reduced at vehicle speeds from medium to high. In other words, as described in FIG. 5, with an increase of vehicle speed, the standby flow is changed from a low-speed standby flow to a high-speed standby flow. This change in flow makes it possible to prevent an unnecessary standby flow at vehicle speeds from medium to high.

Similarly the first embodiment, in the second embodiment, limiters are also individually provided for applying the current instruction values I7, I8 serving as the limiting values to the resultant values immediately after the multiplication of the current instruction values I5, I6 serving as the gains. However, instead of the individual limiters, an across-the-board limiter may be provided for applying a vehicle speed-based current instruction value serving as a limiting value to the resultant value of the addition of the standby current instruction value.

Further, instead of the separate multiplication of the gains, a value adopted in the value comparison may be multiplied by a vehicle speed-based current instruction value as an across-the-board gain.

Still further, an across-the-board limiter may be provided for applying a vehicle speed-based current instruction value serving as a limiting value to a value resulting from the addition of the standby current instruction value, and also the value adopted by the value comparison may be multiplied by a vehicle speed-based current instruction value as an across-the-board gain.

Figure 4:
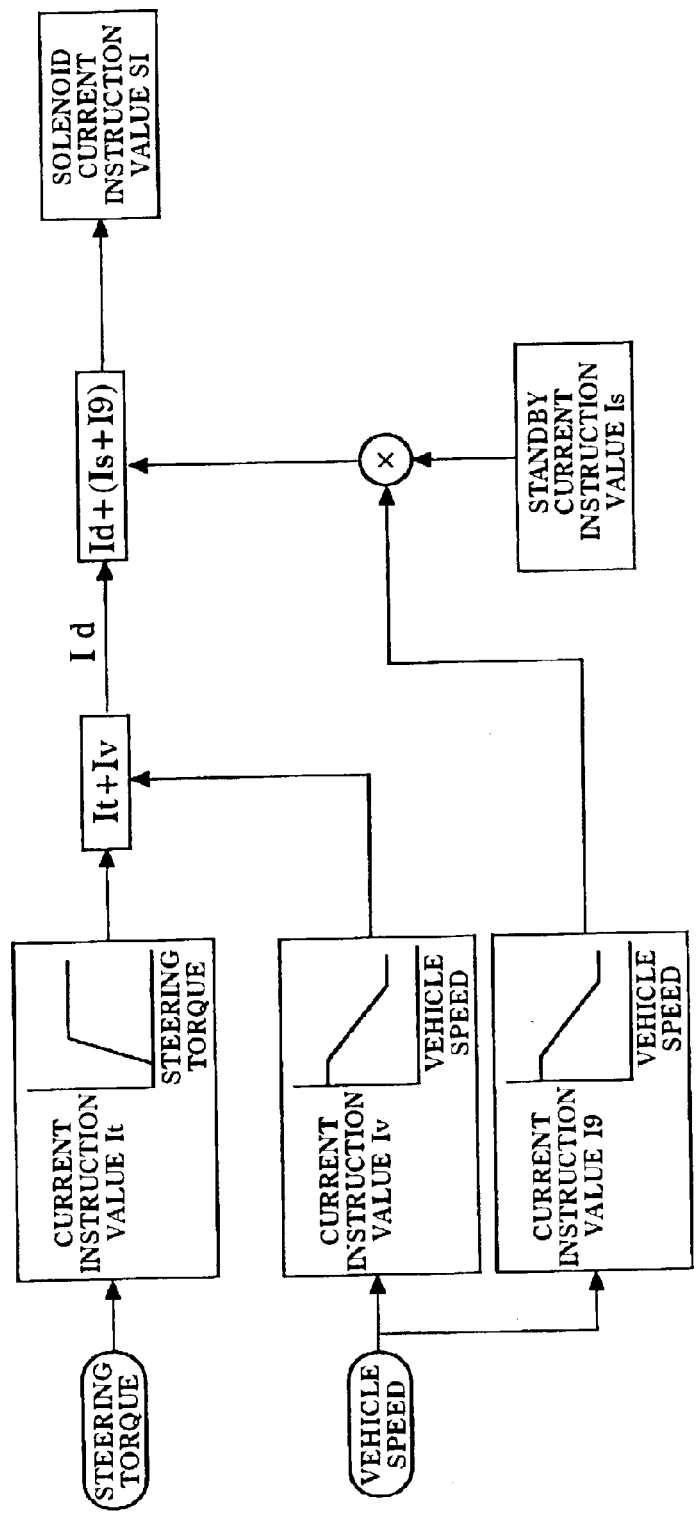
FIG. 4 is a diagram illustrating a control system of a controller C in a third embodiment.

Next, a third embodiment is illustrated in FIG. 4, which use steering torque to calculate a basic current instruction value Id. Specifically, in the third embodiment a steering torque sensor for detecting steering torque is connected to the controller C. The controller C calculates a basic current instruction value Id on the basis of a current instruction value It, determined in accordance with the steering torque, and a vehicle speed-based current instruction value Iv. Specifically, the current instruction value It based on the steering torque is multiplied by the vehicle speed-based current instruction value Iv to obtain a basic current instruction value Id. Then, a standby current instruction value Is is added to the basic current instruction value Id. Note that the standby current instruction value Is is also multiplied by a current instruction value I9 set on the basis of the vehicle speed in the third embodiment.

Hence, in the third embodiment as well as the other embodiments, the standby flow is reduced at vehicle speeds from medium toward high, resulting in the prevention of the unnecessary standby flow to be produced at vehicle speeds from medium toward high.

In the first to third embodiments, the standby current instruction value Is is multiplied by the current instruction value I9 set on the basis of the vehicle speed. However, the controller C may be designed to store a table of the standby current instruction values Is in accordance with vehicle speeds, and performs an addition of a standby current instruction value, obtained from the table in accordance with the vehicle speed, to the above basic current instruction value Id. In other words, a standby current instruction value Is maybe changed on the basis of vehicle speeds.

Figure 6:
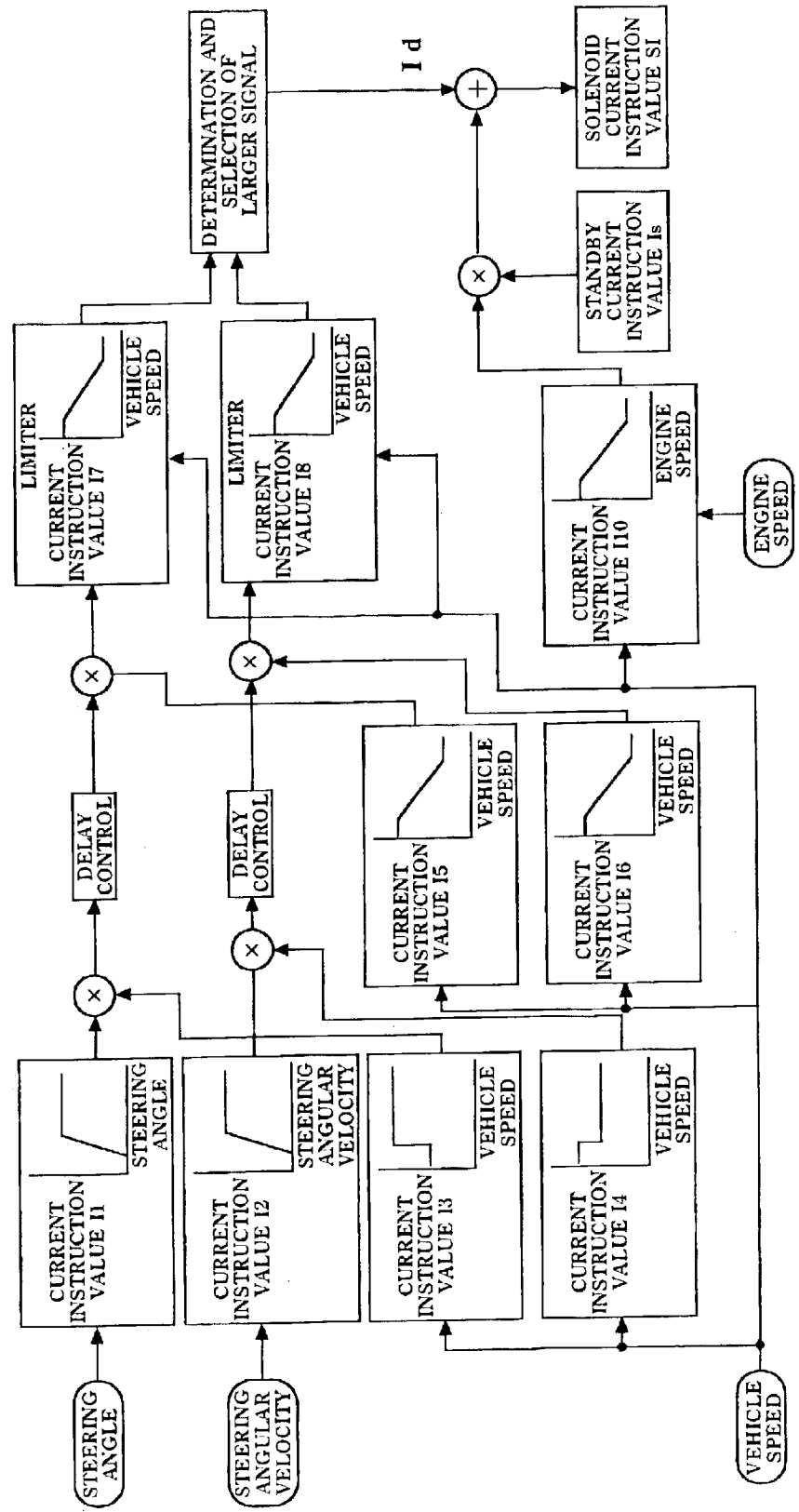
FIG. 6 is a diagram illustrating a control system of a controller C in a fourth embodiment.

Additionally, although the standby current instruction value Is may be controlled changeably on the basis of the vehicle speed in the first to third embodiments, the standby current instruction value Is may be changeably controlled based on the number of revolutions of an engine instead of a vehicle speed. In a fourth embodiment illustrated in FIG. 6, that is to say, an engine speed sensor for detecting the number of revolutions of the engine may be connected to the controller C and the controller C may multiply the standby current instruction value Is by a current instruction value I10 corresponding to the number of revolutions of the engine detected by the engine speed sensor. The current instruction value based on the number of revolutions of the engine is outputted at 1, a maximum value, at high engine speeds, and then gradually reduced at medium engine speeds as the number of revolutions of the engine is increased. Then, the current instruction value is maintained at the minimum level at low engine speeds.

The engine typically has a high number of revolutions during high speed travel. From this fact, it can be concluded that a vehicle speed is high when the number of revolutions of the engine is high. Then, the standby current instruction value Is is set to decrease when the engine has a high number of revolutions. Such setting of the standby current instruction value allows the prevention of the unnecessary standby flow from being produced at vehicle speed from medium toward high as in the case of the standby current instruction value set on the basis of the vehicle speeds.

Additionally, the engine is coupled to a pump, so that the number of strokes of the pump is proportional to the number of revolutions of the engine. Hence, the number of strokes of the pump may be detected by the engine speed sensor, and the standby current instruction value Is may be controlled changeably on the basis of the detected number of strokes of the pump in a manner similar to the use of the number of revolutions of the engine as described above.

Further, the controller C may be designed to store a table of standby current instruction values Is determined in accordance with the number of revolutions of the engine or strokes of the pump, and obtain from the table a standby current instruction value in accordance with the number of revolutions of the engine or strokes of the pump for an addition of the obtained standby current instruction value to the aforementioned basic current instruction value Id. That is to say, a standby current instruction value Is may be so set as to change on the basis of the number revolutions of the engine or strokes of the pump.

We claim:

1. A power steering system comprising:
   a steering valve (9) for controlling a power cylinder (8);
   a variable orifice (a) provided upstream from the steering valve (9);
   a solenoid (SOL) for controlling a degree of opening of the variable orifice (a);
   a controller (C) for controlling a solenoid current instruction value (SI) used for driving the solenoid (SOL);
   a steering angle sensor (14), a vehicle speed sensor (15) and an engine speed sensor which are connected to the controller (C); and
   a flow control valve (V) for dividing a flow, supplied from a pump (P), into a control flow (QP) supplied to the steering valve (V) in accordance with the degree of opening of the variable orifice (a), and a return flow (QT) circulating back to a tank (T) or the pump (P),
   the controller (C) determining a basic current instruction value (Id) on the basis of a current instruction value (I1) in accordance with a steering angle supplied from the steering angle sensor (14), a current instruction value (I2) in accordance with a steering angular velocity and current instruction values (I5, I6) in accordance with a vehicle speed,
   adding a standby current instruction value (Is) to the basic current instruction value (Id),
   outputting the resultant value of the addition as the solenoid current instruction value (SI), and
   changing the standby current instruction value (Is) on the basis of the number of revolutions of an engine or strokes of a pump detected by the engine speed sensor.

2. A power steering system comprising:
   a steering valve (9) for controlling a power cylinder (8);
   a variable orifice (a) provided upstream from the steering valve (9);

a solenoid (SOL) for controlling a degree of opening of the variable orifice (a);

a controller (C) for controlling a solenoid current instruction value (SI) used for driving the solenoid (SOL);

a steering torque sensor, a vehicle speed sensor (15), and an engine speed sensor which are connected to the controller (C); and a flow control valve (V) for dividing a flow, supplied from a pump (P), into a control flow (QP) supplied to the steering valve (V) in accordance with the degree of opening of the variable orifice (a), and a return flow (QT) circulating back to a tank (T) or the pump (P), the controller (C) determining a basic current instruction value (Id) on the basis of a current instruction value (It) in accordance with steering torque detected by the steering torque sensor and a current instruction value (Iv) in accordance with a vehicle speed detected by the vehicle speed sensor (15), adding a standby current instruction value (Is) to the basic current instruction value (Id), outputting the resultant value of the addition as the solenoid current instruction value (SI), and changing the standby current instruction value (Is) on the basis of the number of revolutions of an engine or strokes of a pump detected by the engine speed sensor.

* * * * *